March 2, 1954

M. P. LAURENT 2,670,752

DOUBLE-DISK GATE VALVE HAVING MEANS
TO ELIMINATE PRESSURE LOCK

Filed June 5, 1950

INVENTOR

Milton P. Laurent

BY

ATTORNEY

March 2, 1954
M. P. LAURENT
2,670,752
DOUBLE-DISK GATE VALVE HAVING MEANS TO ELIMINATE PRESSURE LOCK
Filed June 5, 1950
4 Sheets-Sheet 2
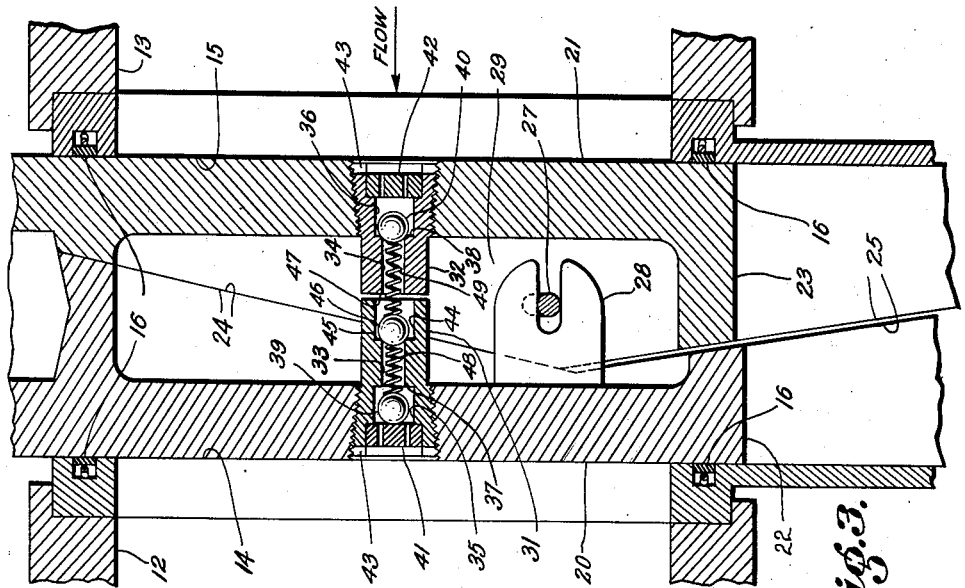
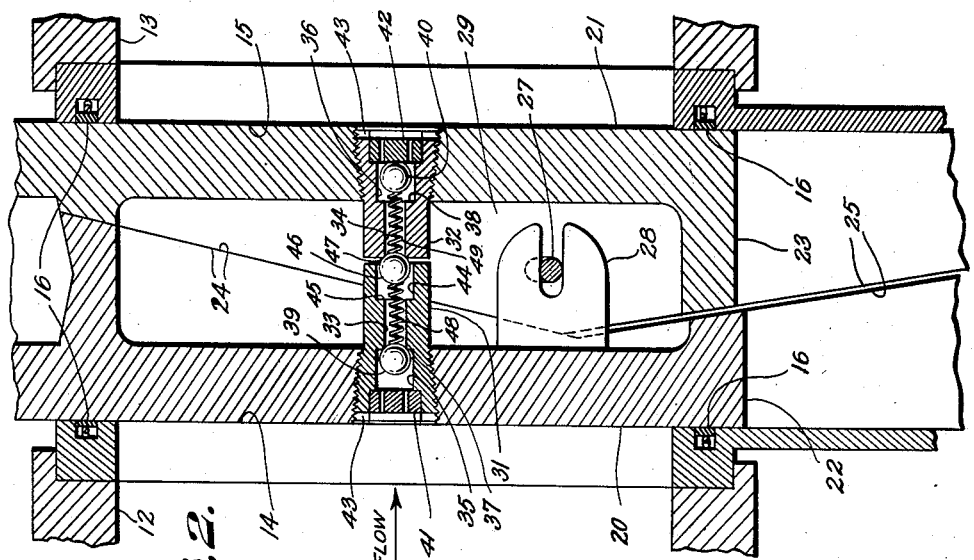
INVENTOR
*Milton P. Laurent*
BY
ATTORNEY

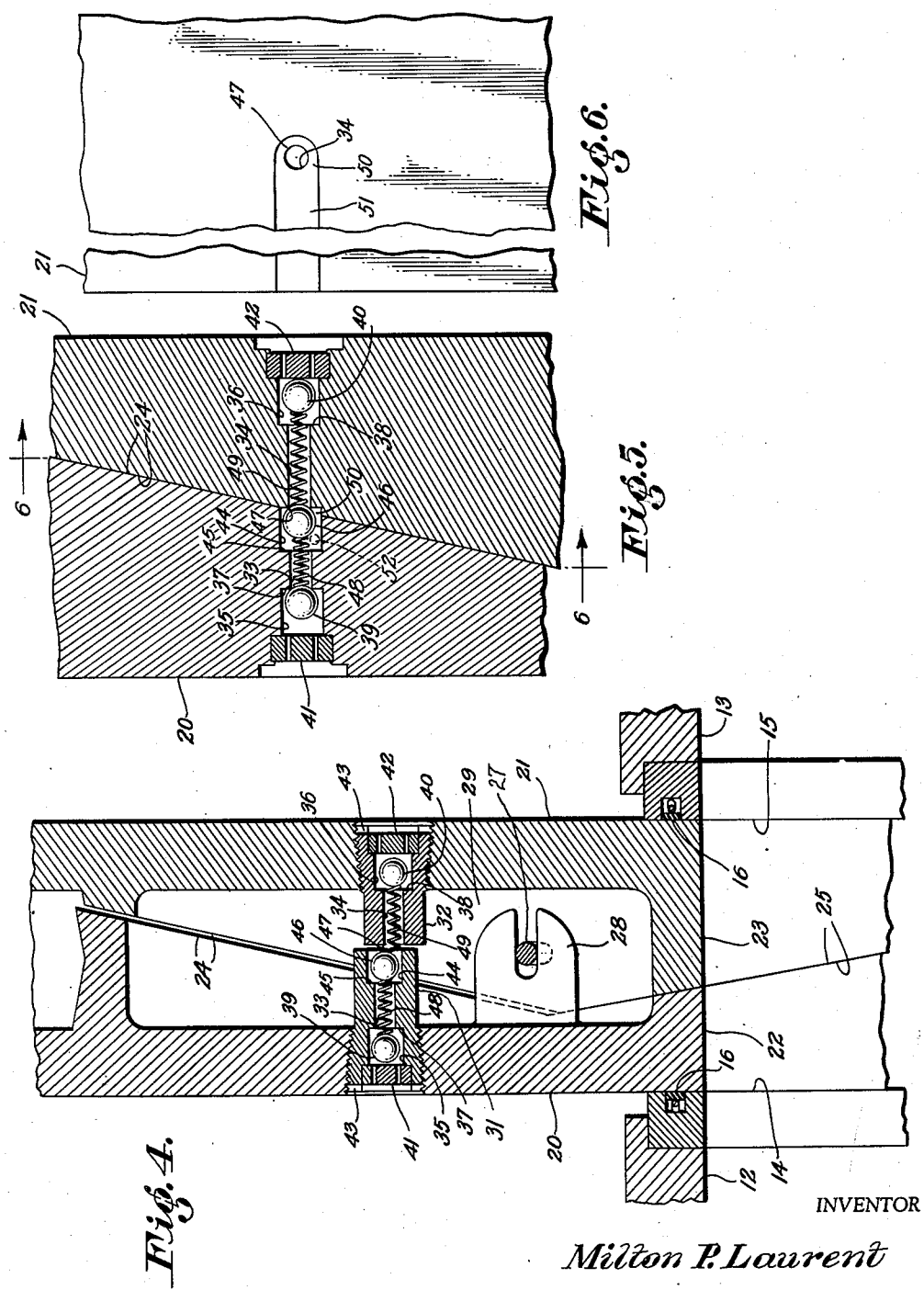

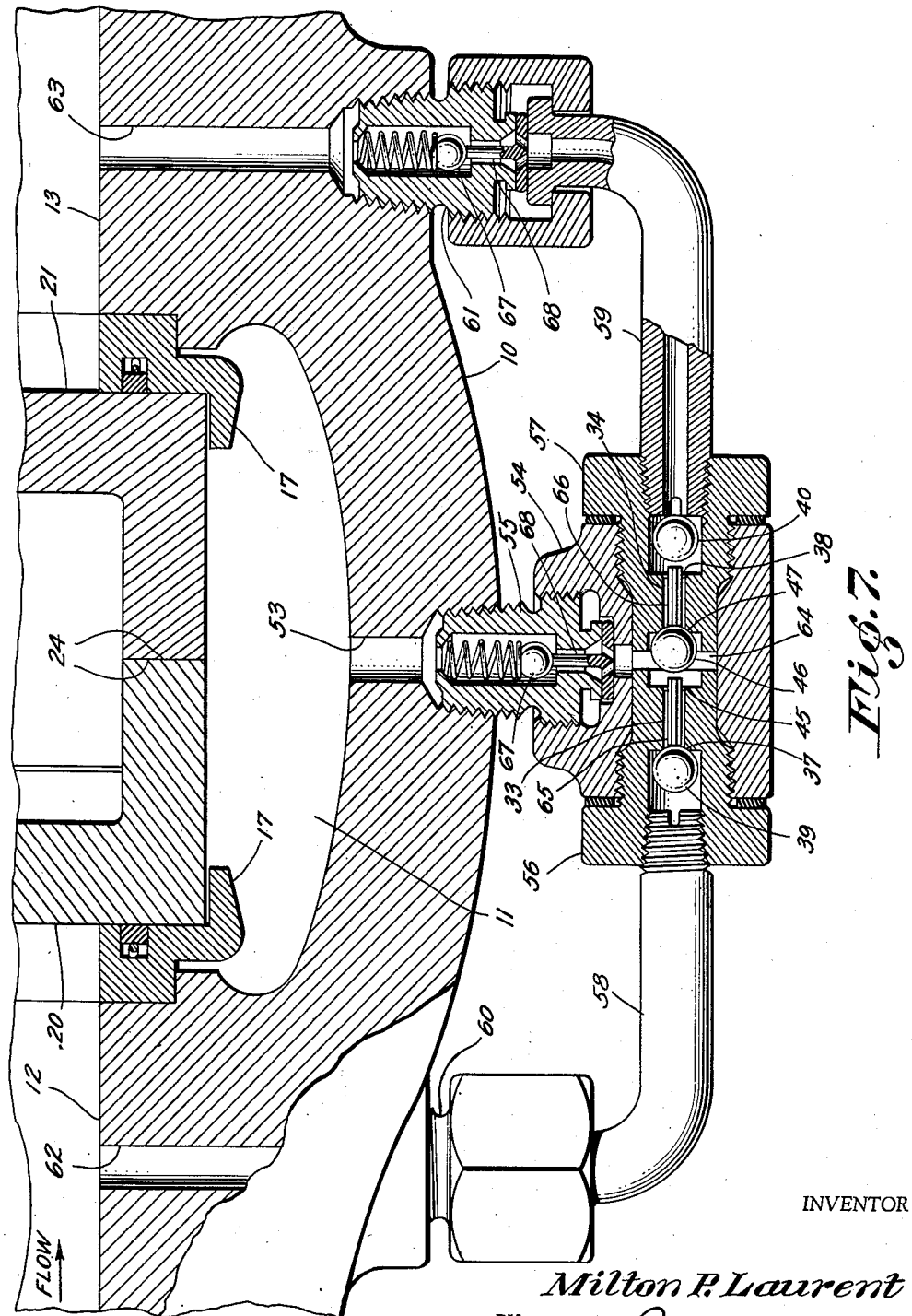

Patented Mar. 2, 1954

2,670,752

UNITED STATES PATENT OFFICE 2,670,752

DOUBLE-DISK GATE VALVE HAVING MEANS TO ELIMINATE PRESSURE LOCK

Milton P. Laurent, Houston, Tex., assignor to W-K-M Company, a joint venture

Application June 5, 1950, Serial No. 166,130

12 Claims. (Cl. 137—119)

This invention pertains to gate valves and more particularly to means for preventing the occurrence of pressure lock in a gate valve having a double-disk, or two-piece valve gate.

This type of valve gate has two separate members adapted, when the valve is closed, to engage and seal opposed valve seats. In some constructions these members, or valve disks, are merely spring biased into engagement with the valve seats. In this case, where high line pressures occur only the downstream valve disk provides an effective seal, since fluid under pressure in the upstream line can force the upstream valve disk off its seat and thereby leak into the housing. This pressure fluid, however, provides an additional force to hold the downstream valve disk against its seat. In other constructions the valve gate is expansible, that is, mechanical means, such as a wedge, cam, toggle, screw, etc., are used to positively force the two valve disks oppositely against the valve seats when the valve is closed. In this case a tight seal is provided by both valve disks. In the first mentioned types of construction, i. e. the spring biased type, fluid within the valve housing cannot escape into either side of the line because each valve disk, when engaged with its corresponding seat, is in effect a check valve. If no means are provided in the second mentioned type of construction, i. e. the expansible type, to positively retract or force the valve disks off their seats as, or before, the valve gate is moved from closed to open position, the same check valve effect obtains.

Because of this check valve effect, double disk gate valves, when connected into a fluid pressure line, are subject to a condition known as "pressure lock." This condition occurs if the pressure of the fluid trapped within the valve housing exceeds the pressures on both sides of the line. Normally, when the valve is closed, housing pressure is equal to or somewhat less than line pressure, that is, the pressure on the upstream side of the line. This housing pressure may exceed line pressure, however, if the valve is closed against line pressure and the latter subsequently relieved, or if the housing pressure is increased, e. g., by thermal expansion of the trapped fluid. In gate valves which seal in the open position, excessive housing pressure, due to expansion of fluid trapped in the housing, may also be dangerous, and produce housing failure unless such pressure is relieved.

A pressure lock situation, in every instance, increases the force necessary to unseal or open the valve because the pressure differential between the housing and both sides of the line presses both of the valve disks tightly against their seats. In some instances such pressure-differential valve-disk seating forces are so great that it is extremely difficult, if not impossible, to open the valve. Additionally, if the valve gate is of the double-wedging expansible type, a pressure lock situation gives rise to further difficulties in opening the valve, as explained more fully in my copending application filed January 16, 1950, Serial No. 138,780, now Patent 2,583,512, dated January 22, 1952. Furthermore, the development of a pressure lock situation by thermal expansion may create a dangerous condition, in addition to causing the aforementioned valve-opening difficulties. In such instances, thermal expansion by a fire, or even the heat of the sun, may in some cases cause pressure rises as much as 75 lbs. per square inch per degree F. of temperature increase. Hence, housing pressures sufficient to crack the housing or the bonnet may develop. If the valve so fractured controls a combustible fluid and a fire is present, the consequent results may be disastrous.

Hence, it is common practice amongst users of double-disk valves to score or scratch the upstream, or inlet, valve seat, once the direction of flow has been determined, in order to constantly maintain equal pressures between the housing and the upstream line. Such practice, of course, automatically reduces the valve to a single effective valve seat, i. e. the outlet or downstream seat. If the double-disk valve so scored, if of the simple spring-biased type, i. e. not positively expansible, it thereafter can handle pressures from one side only, that is, from the scored side of the valve.

To overcome the troublesome effects of a pressure lock situation, valves of the expansible type are frequently provided with springs designed to contract the valve gate once the mechanical expansive forces are relieved. Such contraction unseals that valve seat having the lesser pressure differential thereacross, thereby relieving the excessive housing pressure. Such a spring-equipped expansible valve is shown, for example, in U. S. Patent No. 2,479,124, issued August 16, 1949, to M. P. Laurent. Springs, however, are impositive in their action and frequently cannot provide sufficient contracting forces to relieve a pressure lock situation. Hence, springs are not completely dependable for this purpose. Moreover, it is far better to prevent the occurrence of a pressure lock situation than to provide means for overcoming such situation once it develops.

Accordingly, it is an object of this invention to provide a double-disk gate valve that is not subject to pressure lock.

It is another object of this invention to provide simple and inexpensive means for preventing pressure lock in any type of double-disk gate valve.

It is still another object of this invention to provide an expansible double-disk gate valve that is not subject to pressure lock, that can handle pressure from either side thereof, and in which both valve seats are effective.

It is still another object of this invention to provide a double-disk gate valve with means to permit pressure in the housing, in excess of line pressure when the valve is closed, to bleed back into the upstream side of the line without leakage to the downstream side.

It is a still further object of this invention to provide a simple attachment for preventing pressure lock in any type of double-disk gate valve.

It is a further object of this invention to provide such an attachment that can readily be connected to and disconnected from a double-disk gate valve while the latter is in service.

Other objects and advantages of the invention will be evident from the following description and accompanying drawings in which:

Figure 2 is an enlarged fragmentary sectional view of a portion of the valve shown in Figure 1.

Figure 3 is a view corresponding to Figure 2 with the line flow reversed.

Figure 4 is a view corresponding to Figure 2 showing the valve in open position.

Figure 5 is an enlarged fragmentary view, corresponding to Figure 2, of a different type of closed double-disk gate valve embodying this invention.

Figure 6 is a fragmentary view taken on line 6—6 of Figure 5.

Figure 7 is a fragmentary sectional view taken on a line corresponding to 7—7 in Figure 1 and illustrating a modification of the invention. The flow situation illustrated corresponds to that shown in Figure 2.

Figure 1:
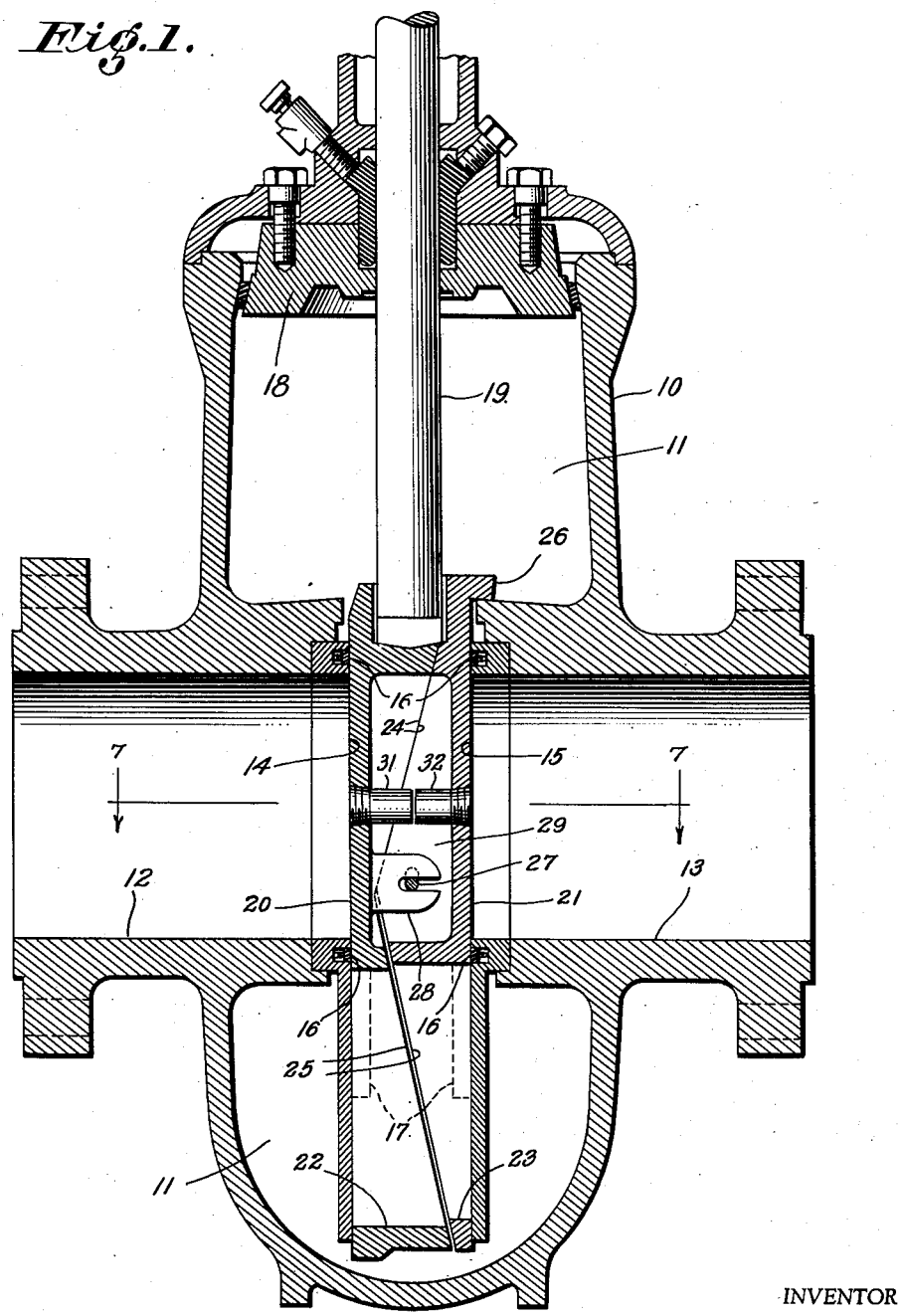
Figure 1 is an elevational view, partly in vertical section, of a closed double-disk gate valve embodying this invention.

This invention is illustrated by incorporation in through-conduit double-wedging expansible gate valves, but it will be understood that the invention may be incorporated in any type of double-disk gate valve, whether of the through-conduit type or not.

Referring to the drawings, there is shown in Figure 1 a through-conduit, double-wedging expansible gate valve of the rising stem type. The valve has a housing 10 forming an interior valve chamber 11 in which is located the gate mechanism of the valve. Aligned fluid ports 12, 13 in opposite walls of the housing are provided with parallel, preferably removable, flat-faced valve seats 14, 15 having spring-pressed wiping or sealing rings 16 and side flanges 17. These flanges, together with the valve seats, serve to confine and guide the gate mechanism to substantially rectilinear movement in opening and closing the valve, as later described. The upper portion of the housing is of known construction having a bonnet 18 through which extends the valve operating stem 19. The stem is threadedly connected to a conventional handwheel (not shown), rotation of which produces axial movement of the stem.

The ported valve gate assembly, which slides rectilinearly between the seats 14, 15, is formed in two sections or valve disks, one hereinafter termed the gate 20 and the other the segment 21. Both sections have ports 22, 23 which in the open position of the valve (as shown in Figure 4) are aligned with the housing ports 12, 13 to provide a uniform, smooth-walled, unbroken passageway for unobstructed flow of fluid through the valve. The lower or inner end of the valve stem 19 is detachably connected to the adjacent end of the gate 20, preferably by a T-head and slot connection, as shown. Hence, axial movement of the stem raises or lowers the valve gate assembly to open or close the valve.

The gate 20 and the segment 21 have flat outer faces disposed parallel to their respective flat-faced valve seats for sealing engagement therewith. The inner opposed faces of the gate and segment are formed with two complementary, angularly-related surface portions that diverge in the same direction from the midportions of the gate and segment to provide two sets of wedging surfaces 24, 25. When both sets of these wedging surfaces are in contact (not shown) the overall transverse dimension of the gate assembly, i. e. normal to the valve seats, is slightly less than the distance between the valve seats. Hence, the two valve disks, when assembled in the housing, can be displaced to a limited extent, relative to each other in directions parallel to the movement of the assembly. At both extremes of such displacement the gate assembly is expanded, by the action of one of the sets of wedging surfaces 24, 25, and the outer faces of the gate 20 and segment 21 are forced into tight sealing engagement with their respective valve seats 14, 15. Wedging relative displacement, from a centered relative position wherein the apexes of the inner opposed faces are aligned, is imparted to the gate and segment adjacent both ends of travel of the assembly in order to seal the valve. Such relative displacement is effected by a projection 26 on one end of the segment 21 which, upon contact with corresponding fixed abutments within the valve chamber 11, stop further movement of the segment while the gate 20 continues to be moved by the valve stem 19. Hence, the gate assembly is forcibly expanded and the valve sealed in open position by the wedging surfaces 25, and in the closed position by the wedging surfaces 24. The valve thus far described is like that shown and described in the aforementioned patent.

Preferably the valve gate assembly is provided with at least one cross spring 27 having its opposite ends secured to the segment 21 and the opposite sides of its central portion engaged by a slotted lug 28 which projects from the gate 20 into a chamber or space 29 formed between the two assembly sections by opposed recesses in their inner surfaces. This spring and lug arrangement, which corresponds to spring "31" and lug "29" in the aforementioned patent, constantly urges the gate and the segment toward centered relative position. Hence, in moving the gate assembly from sealed open or sealed closed position toward the other end of its travel, after the expensive wedging forces have been relieved the spring 27 serves as a connection to effect movement of the segment 21 as a unit with the gate 20 without re-expansion of the assembly, in case the segment should stick in open or closed position, or be held against its seat by pressure differential forces when the valve is closed. These re-expansion effects are described more in detail in the aforementioned Patent No. 2,583,512. Instead of the illustrated spring connection, the mechanism shown in the previously mentioned application may be used to connect the gate and segment and to maintain these parts in centered relative position during movement from one end of their travel to the other.

The means for preventing the occurrence of a pressure lock situation in the valve shown in Figure 1 is apart of the valve gate assembly and includes two check valves which, when the valve is closed, permit fluid to flow out of the valve chamber 11 through the gate and segment, respectively, into the corresponding fluid ports. The check valves may be in the form of fittings 31, 32 (shown best in Figures 2, 3 and 4) adapted to be threaded into corresponding holes drilled through the gate 20 and the segment 21, respectively, and to project into the space 29. These holes preferably are aligned when the valve is in closed and sealed position. The fittings have central passageways 33, 34 therethrough and are counterbored at their outer ends, as at 35, 36, for the reception of, and to provide seats 37, 38 for, ball checks 39, 40, respectively. These ball checks 39, 40, which are of smaller diameter than their respective counterbores 35, 36, are retained in the fittings 31, 32 by screen disks 41, 42 secured in suitable recesses in the fittings adjacent the outer ends of the counterbores. These disks 41, 42 may be secured in place by a pressed fit, as shown, staking, edge rolling, or any other suitable means. The outer ends of the fittings 31, 32 are offset inwardly of the outer sealing surfaces of the gate 20 and segment 21 and may be provided with diametrical slots 43 for the reception of a suitable tool, such as a screw driver, for screwing the fittings in place. An alternative tool-adapting arrangement (not shown) is to make the fittings of hexagon bar stock to permit a wrench to be used for screwing the fittings in place. In this case the taper of the threaded portion of the fittings preferably is reversed so that the fittings are inserted into their holes from the inner faces of the gate and segment.

The inner and adjacent ends of the fittings are closely spaced, yet separated sufficiently to provide communication between the space 29 and both of the passageways 33, 34. When the valve is closed, as shown in Figure 1, the wedging surfaces 25 are parted, thus providing communication between the space 29 and the valve chamber 11, i. e. the interior of the housing. The inner end of the gate fitting 31 is counterbored, as at 44, for the reception of, and to provide a seat 45 for, a ball check 46, which is of smaller diameter than the counterbore 44. This ball check 46 is also adapted to seat against a valve seat 47 on the inner end of the segment passageway 34 so that the counterbore 44 serves merely as a cage for the ball check 46. Therefore, depending upon pressure conditions, later described, the ball check 46 is adapted to close one or the other of the passageways 33, 34 against outward passage of fluid therethrough from the valve chamber 11. Disposed in each passageway and bearing oppositely against the ball checks 39, 46 and 46, 40, respectively, are coil springs 48, 49. These springs 48, 49, when uncompressed, are normally slightly longer than the distance between the valve seats 37, 45 and 47, 38 of their respective passageways 33, 34. The function of these springs will be explained later.

The operation of these ball checks will be explained first with reference to Figure 2, wherein the valve is shown as having been closed against flow as indicated by the arrow so that pressure is on the gate side of the line, i. e. the upstream side, with a lower, or no, pressure in the segment side of the line, i. e. the downstream side. As the valve is closing the upstream pressure seats the ball checks 39, 46 against seats 37, 47, respectively, and unseats ball check 40. Hence, fluid cannot flow through the gate passageway 33 into the valve chamber 11, or through the segment passageway 34 out of the valve chamber. It is evident, therefore, that both the gate 20 and segment 21 provide effective seals against their respective valve seats 14, 15. If, however, the pressure of the fluid trapped in the valve chamber 11 rises above that in the upstream line, or conversely, the latter pressure drops below that of the trapped fluid, the ball check 39 will unseat and permit the pressure in the housing to equalize with that in the upstream side of the line. Hence, housing pressure cannot exceed upstream line pressure. It is to be noted at this point that no leakage can take place through the valve from the upstream to the downstream side of the line or from the valve chamber to the downstream side of the line.

If, now, the flow situation is reversed and the segment side of the line becomes the upstream side, as shown in Figure 3, ball checks 40, 46 seat against seats 38, 45, respectively, and ball check 39 is unseated. Hence, no leakage can occur through the segment passageway 34 into the valve chamber 11 or through the gate passageway 33 out of the valve chamber, yet pressure in the housing cannot exceed that in the upstream side of the line because of the ball check 40.

The springs 48, 49 are used as spacers to cause the ball checks 39, 46 or 40, 46 to seat in unison, depending on the direction of flow through the valve. Additionally these springs prevent the possibility of both ends of the passageways 33, 34 from being sealed. These springs, however, do not seat the ball checks. Such seating is accomplished by pressure. The ball check retaining screens 41, 42 serve, to some extent, to filter fluid as it flows through the passageways 33, 34 to avoid their possible clogging. These screens are self cleaning by any reversal of flow which occurs in normal operation of the valve.

When the valve is open, as shown in Figure 4, the ball checks are completely free because the pressures at opposite ends of the passageways 33, 34 are equal. In this position the fittings 31, 32 are out of alignment, but the amount of their relative displacement is insufficient to prevent retention of the ball check 46 in the counterbore 44.

In smaller size valves and in valves wherein no chamber is provided between the wedging surfaces used to seal the valve in its closed position, the passageways 33, 34 obviously can be drilled directly through the parts, thus eliminating the necessity of separate fittings. Valves of the latter type are shown, for example, in U. S. Patent No. 2,478,811 to J. S. Downs. An embodiment of this invention in a valve of this type is shown in Figures 5 and 6. In this instance the gate 20 and the segment 21 are substantially solid blocks so that the wedging surfaces 24 used to seal the valve in its closed position are substantially uninterrupted plane surfaces. Hence, the passageways 33, 34 and corresponding ball-check-receiving counterbores 35, 44, 36 may be drilled directly into the gate and the segment. The ball-checkretaining screens 41, 42 may be fitted into appropriate recesses adjacent the outer ends of the counterbores 35, 36, respectively, and edge rolled, as shown, staked, or otherwise suitably secured in place. Since the annular valve seat 47 at the inner end of the passageway 34 through the segment should be parallel to the seat 45 in order for the ball check to operate most effectively, the inner face of the segment is suitably recessed at this point, as indicated at 50, to provide for the seat 47.

It is obvious that for this invention to operate successfully, communication must be established between the valve chamber 11 and the adjacent or inner ends of both passageways 33, 34 when the valve is closed. No such communication normally exists in a valve of the type shown in Figure 5. Such communication may readily be provided, however, in several ways. One such way is to provide a groove 51 (see Figure 6) constituting an extension of the recess 50 and extending laterally across the inner face of the segment 21 to the side thereof. Another such way is to drill a laterally extending hole 52 (indicated by dotted lines in Figure 5) from the side of the gate 20 into the counterbore 44. In both such ways housing pressure may enter the counterbore 44 when the valve is closed and sealed.

Another modification of the invention is illustrated in Figure 7 wherein the essential check valves are mounted on the outside of the valve housing instead of in the valve gate. In this construction a side wall of the housing 10 has a passageway 53 providing communication between the valve chamber 11 and the exterior of the housing. The side port of a T-fitting 54 is connected to the outer end of the passageway 53, as by a threaded nipple 55. Connected to the aligned ports of the T-fitting 54, by plugs 56, 57 having passageways 33, 34 therethrough, are conduits 58 and 59, respectively. The other ends of the conduits 58, 59 are coupled to threaded nipples 60, 61 mounted in the outer ends of passageways 62, 63, respectively, extending through the housing walls. These latter passageways 62, 63 communicate with the ports 12 and 13, respectively.

The three check valves which are essential to this invention are mounted in the T-fitting 54. The ball checks 39 and 40 which prevent passage of fluid from the ports 12 and 13, respectively, into the valve chamber 11 are mounted in counterbores in the outer ends of the plugs 56 and 57, respectively. These ball checks are retained in their respective counterbores by the ends of the conduits 58, 59, which ends are slotted, as shown, to prevent the ball checks from sealing thereagainst. The alternately-operating intermediate ball check 46, which prevents flow of fluid from the valve chamber 11 into one or the other of the ports 12 and 13, is caged in a chamber 64 formed by counterbores in the spaced opposed inner ends of the plugs 56, 57. The ends of the passageway 33 are provided with seats 37 and 45 for the ball checks 39 and 46, respectively, and the ends of the passageway 34 with seats 47 and 38 for the ball checks 46 and 40, respectively. Instead of the springs 48 and 49 used in the previously described modifications, rigid spacer pins 65 and 66 are loosely mounted in the passageways 33 and 34, respectively. These pins are of somewhat greater length than their respective passageways 33 and 34. Hence, ball checks 39 and 40 cannot seat without unseating ball check 46 from the other end of the corresponding passageway, thus assuring the correct and positive action of all the check valves. This construction provides for relieving excessive pressures in the valve housing in the closed valve position as well as in the open valve position. The operation of this modification is the same as that of the constructions shown in Figures 1 through 6, except that the modified construction also is effective to avoid pressure lock and excessive housing pressures in the open valve position.

Each of the nipples 55, 60, and 61 preferably is provided with a spring-biased check valve 67 adapted to prevent escape of fluid out of the valve chamber 11, and out of the ports 12 and 13, respectively. These check valves are held off their seats by combination ported gaskets and spacer pins 68 supported between the abutting portions of the nipples and the T-fitting and conduits. Hence, when the T-fitting and conduits are disconnected from the nipples, the check valves 67 seat and prevent escape of fluid from the housing. This latter feature possesses the practical aspect of permitting the incorporation of this invention in valves already in service without opening the valve housing or disturbing the service. Additionally, the check valves 67 permit the three essential check valves to be cleaned without interrupting line flow. Suitable screens (not shown) may also be incorporated in the nipples 55, 60, and 61 to prevent clogging of the three operating check valves.

It is realized that numerous variations which embody the principles of this invention will be apparent to one skilled in the art. Therefore, this invention encompasses all embodiments and modifications which come within the spirit and scope of the following claims.

I claim:

1. In a gate valve of the type comprising a housing forming a valve chamber having aligned conduit ports provided with opposed valve seats and a double-disk valve gate mounted for slideable movement between the valve seats to open and close the valve, the improvement comprising: means defining a fluid chamber in communication with the valve chamber; means defining fluid passageways providing communication between each of the valve ports and said fluid chamber; a check valve for and controlling each said passageway to prevent the passage of fluid therethrough from the corresponding port into said fluid chamber; and check valve means alternately controlling said passageways to prevent the passage of fluid therethrough out of said fluid chamber into the corresponding ports, said check valve means being selectively operable by pressure differentials between said fluid chamber and the ports to control one of said passageways.

2. The structure defined in claim 1 including a screen disposed across the port entrance to each passageway to prevent the entry of foreign matter thereinto.

3. In a gate valve of the type comprising a housing forming a valve chamber having aligned conduit ports provided with opposed valve seats and a double-disk valve gate mounted for slideable movement between the valve seats to open and close the valve, the improvement comprising: means defining a fluid chamber in communication with the valve chamber; means defining fluid passageways providing communication between said fluid chamber and each of the valve ports, the ends of said passageways which open into said fluid chamber being substantially oppositely aligned; a check valve for and controlling each said passageway to prevent passage of fluid therethrough from the corresponding port into said fluid chamber; and a valve member disposed in said fluid chamber between said aligned passageway ends and adapted to seat alternately thereagainst to thereby close one of said passageways against passage of fluid therethrough out of said fluid chamber while opening the other of said passageways for passage of fluid therethrough out of said fluid chamber.

4. The structure defined in claim 3 including a movable spacer member disposed in each passageway between the movable element of the corresponding controlling check valve and the said valve member to prevent a said check valve from seating without unseating said valve member from the chamber end of the corresponding passageway.

5. In a gate valve of the type comprising a housing forming a valve chamber having aligned conduit ports provided with opposed valve seats and a valve gate assemblage mounted for slideable movement between the seats to open and close the valve, and in which the valve gate assemblage includes two juxtaposed port-closing members and means to force the members oppositely against the valve seats to seal the valve, means for preventing the pressure within the valve chamber from exceeding the pressure in the upstream side of the line, comprising: means defining a fluid chamber in communication with the valve chamber; fluid passageways connecting each of the ports with opposite sides of said fluid chamber; check valves at the port ends of said passageways to close the same against flow of fluid from the ports into said fluid chamber; and a ball check disposed in said fluid chamber and adapted to seat against the chamber end of that one of said passageways which communicates with the downstream side of the line.

6. In a gate valve of the type comprising a housing forming a valve chamber having aligned conduit ports provided with opposed valve seats and a double-disk valve gate mounted for slideable movement between the valve seats to open and close the valve, the improvement comprising: means defining a space between the valve disks in communication with the valve chamber when the valve is closed; fluid passageways extending through each of the valve disks providing communication between the corresponding port and said space when the valve is closed; a check valve for and controlling each said passageway to prevent the passage of fluid therethrough from the corresponding port into said space; and check valve means disposed in said space and alternately controlling said passageways to prevent the passage of fluid therethrough out of said space into the corresponding ports, said check valve means being selectively operable by pressure differentials between said space and the ports to control one of said passageways.

7. In a gate valve of the type comprising a housing forming a valve chamber having aligned conduit ports provided with opposed valve seats and a valve gate assemblage mounted for slideable movement between the seats to open and close the valve, and in which the valve gate assemblage includes two juxtaposed port-closing members and means to force the members oppositely against the valve seats to seal the valve, means for preventing the pressure within the valve chamber when the valve is closed from exceeding the pressure in the upstream side of the line, comprising: means defining a space between the port-closing members in communication with the valve chamber when the valve is closed, fluid passageways extending through each of the port-closing members and connecting each of the ports with opposite sides of said space; check valves at the port ends of said passageways to close the same against flow of fluid from the ports into said space; and a ball check disposed in said space and adapted to seat against the chamber end of that one of said passageways which communicates with the downstream side of the line.

8. A gate valve of the through-conduit type comprising: a housing forming a valve chamber having aligned conduit ports provided with opposed parallel valve seats; an expansible ported valve gate assemblage mounted for rectilinear movement between said seats to open and close the valve, said assemblage including two juxtaposed ported members having parallel outer sealing faces to engage the valve seats and complementary opposed inner double-wedging faces effective to expand said assemblage normally of said seats and force said members oppositely into sealing engagement therewith upon relative displacement between said members, in either direction parallel to the rectilinear movement of said assemblage, from a centered relative position wherein the apexes of said inner faces are aligned; means for moving said assemblage to valve-open and valve-closed positions; means for effecting assemblage-expansive wedging action between said members adjacent both ends of travel of said assemblage in order to seal the valve; and means, effective when the valve is connected into a line and closed, for preventing valve chamber pressure from exceeding line pressure, said last-mentioned means including means defining a space between said port-sealing members in communication with said valve chamber, substantially aligned fluid passageways extending through said members to provide communication between said space and both sides of the line, check valves controlling said passageways to prevent entry of fluid into said space from the line, and a movable valve element disposed in said space and alternately controlling said passageways to prevent escape of fluid therethrough into the line, said valve element being selectively operable by pressure differentials between said space and both sides of the line to prevent escape of fluid through that passageway which communicates with the downstream side of the line.

9. In a gate valve of the type comprising a housing forming a valve chamber having aligned conduit ports provided with opposed valve seats and a double-disk valve gate mounted for slideable movement between the valve seats to open and close the valve, the improvement comprising: means defining a fluid chamber disposed exteriorly of the valve housing; a fluid passageway extending through the housing wall and providing communication between said fluid chamber and the valve chamber; additional fluid passageways extending through the housing wall and providing communication between said fluid chamber and each of the valve ports; a check valve for and controlling each of the said additional passageways to prevent passage of fluid therethrough from corresponding port into said fluid chamber; and check valve means disposed in said fluid chamber and alternately controlling said additional passageways to prevent passage of fluid therethrough out of said fluid chamber into the corresponding ports, said check valve means being selectively operable by pressure differentials between said fluid chamber and said ports to control one of said additional passageways.

10. In a gate valve of the type comprising a housing forming a valve chamber having aligned conduit ports provided with opposed valve seats and a valve gate assemblage mounted for slideable movement between the seats to open and close the valve, and in which the valve gate assemblage includes two juxtaposed port-closing members and means to force the members oppositely against the valve seats to seal the valve, means for preventing the pressure within the valve chamber from exceeding the pressure in the upstream side of the line, comprising: means defining a fluid chamber disposed exteriorly of the valve housing; a fluid passageway extending through a side wall of the valve housing and connecting said fluid chamber with the valve chamber; additional fluid passageways connecting said each side of the line to opposite sides of said fluid chamber, check valves controlling said additional passageways to prevent passage of fluid therethrough from the line into said fluid chamber; and a valve member disposed in said fluid chamber and adapted to seat against the chamber end of that one of said additional passageways connected with the downstream side of the line.

11. In a gate valve of the type comprising a housing forming a valve chamber having aligned conduit ports provided with opposed valve seats and a double-disk valve gate mounted for slideable movement between the valve seats to open and close the valve, the improvement comprising: fluid passageways extending through the walls of the valve housing from the valve chamber and from each of the ports to the exterior of the housing; means defining a fluid chamber disposed exteriorly of the valve housing; conduit means detachably connecting said fluid chamber to each of said passageways; check valves preventing passage of fluid through each of said port passageways from the ports into said fluid chamber; and check valve means disposed in said fluid chamber and alternately preventing passage of fluid out of said chamber into said port passageways, said check valve means being selectively operable by pressure differentials between said fluid chamber and said ports to prevent passage of fluid into one of said passageways.

12. The structure defined in claim 11 in which the conduit means detachably connecting the fluid chamber with each of the passageways includes couplings having housing-connected elements provided with check valves adapted to prevent passage of fluid therethrough out of the valve chamber and out of the ports and means operative upon connection of said couplings to unseat said check valves.

MILTON P. LAURENT.

References Cited in the file of this patent

UNITED STATES PATENTS

| Number | Name | Date |
|---|---|---|
| Re. 20,101 | Laurent | Sept. 8, 1936 |
| 1,559,515 | Bottner | Oct. 27, 1925 |
| 2,351,775 | McMurry | June 20, 1944 |
| 2,449,392 | Kremiller | Sept. 14, 1948 |

FOREIGN PATENTS

| Number | Country | Date |
|---|---|---|
| 4,947 | Great Britain | of 1893 |
| 613,266 | Great Britain | of 1948 |